(12) United States Patent
Jamkhedkar et al.

(10) Patent No.: US 12,299,651 B2
(45) Date of Patent: May 13, 2025

(54) SOFTWARE DEVELOPMENT KITS FOR POINT-OF-SALE DEVICE AND MOBILE DEVICE INTERACTIVE FRAMEWORKS

(71) Applicant: PAYPAL, INC., San Jose, CA (US)

(72) Inventors: Prashant Jamkhedkar, Fremont, CA (US); Haoyu Xue, San Jose, CA (US); Jie Leng, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 559 days.

(21) Appl. No.: 17/539,001

(22) Filed: Nov. 30, 2021

(65) Prior Publication Data

US 2022/0083994 A1 Mar. 17, 2022

Related U.S. Application Data

(63) Continuation of application No. 16/884,031, filed on May 26, 2020, now Pat. No. 11,216,791, which is a
(Continued)

(51) Int. Cl.
*G06Q 20/20* (2012.01)
*G06F 8/30* (2018.01)
(Continued)

(52) U.S. Cl.
CPC ............. *G06Q 20/102* (2013.01); *G06F 8/30* (2013.01); *G06Q 20/20* (2013.01); *G06Q 20/202* (2013.01);
(Continued)

(58) Field of Classification Search
CPC ............................ G06Q 20/102; G06Q 20/20
See application file for complete search history.

(56) References Cited

U.S. PATENT DOCUMENTS 10,147,086 B2 * 12/2018 Teuwen ............... G06Q 20/327
2003/0126075 A1 7/2003 Mascavage, III et al.
(Continued)

OTHER PUBLICATIONS

Anonymous., "MobileStorm Releases the Next Generation of Flagship Digital Marketing Platform", Business Wire, New York, Jun. 17, 2008, 3 pages.

*Primary Examiner* — Edward Chang
(74) *Attorney, Agent, or Firm* — Haynes and Boone, LLP

(57) ABSTRACT

There are provided systems and methods for software development kits for point-of-sale device and mobile device interactive frameworks. A service provider, such as a payment provider, that offers online and cloud based digital wallet services may configure flexible software frameworks for a merchant's point-of-sale device and a user's mobile device. A framework for a merchant's device may allow for user check-in with the merchant, and may utilize multiple different communication protocols to receive tenders and non-tenders from the user's mobile device. Thus, the user's mobile device may communicate with the merchant device to provide tokens that may be resolved by the merchant using the payment provider and/or a payment host to receive payment processing confirmation. Moreover, the frameworks may allow for a transaction to be synchronized to the user's mobile device so that the user may receive updates after processing of the tokens.

20 Claims, 5 Drawing Sheets

Related U.S. Application Data continuation of application No. 15/199,562, filed on Jun. 30, 2016, now Pat. No. 10,664,812.

(60) Provisional application No. 62/255,098, filed on Nov. 13, 2015.

(51) Int. Cl.
*G06Q 20/10* (2012.01)
*G06Q 20/32* (2012.01)
*G06Q 20/34* (2012.01)
*G06Q 20/36* (2012.01)
*G06Q 20/38* (2012.01)
*G07F 9/00* (2006.01)
*G07G 1/00* (2006.01)

(52) U.S. Cl.
CPC ....... *G06Q 20/322* (2013.01); *G06Q 20/3274* (2013.01); *G06Q 20/356* (2013.01); *G06Q 20/3672* (2013.01); *G06Q 20/3821* (2013.01); *G07F 9/006* (2013.01); *G07G 1/0009* (2013.01)

(56) References Cited

U.S. PATENT DOCUMENTS

| | | |
|---|---|---|
| 2003/0229590 A1 | 12/2003 | Byrne et al. |
| 2009/0271322 A1 | 10/2009 | Lay et al. |
| 2012/0005076 A1* | 1/2012 | Dessert .............. G06Q 30/0238 |
| | | 235/375 |
| 2012/0016731 A1 | 1/2012 | Smith et al. |
| 2012/0330845 A1 | 12/2012 | Kang |

* cited by examiner

| No | CheckIn | Start of Transaction | Selection Non-tender OR Tender (Single) | Selection Non-tender OR Tender (Multiple) | Selection Non-tender OR Tender (Multiple) | Complete Transaction Non-tender OR tender (Single/Multiple) |
|---|---|---|---|---|---|---|
| 1 | O | QR | M | M | M | M |
| 2 | O | NFC | M | M | M | M |
| 3 | O | BLE | M | M | M | M |
| 4 | O | QR | QR | QR | QR | QR |
| 5 | O | QR | M | M | M | NFC |
| 6 | O | QR | M | M | M | BLE |
| 7 | O | BLE | M | M | M | BLE |
| 8 | O | BLE | BLE | BLE | BLE | BLE |
| 9 | O | BLE | M | M | M | NFC |
| 10 | O | NFC | M | M | M | NFC |
| 11 | O | NFC | M | M | M | BLE |
| 12 | O | - | - | - | - | NFC |
| 13 | O | NFC | QR | QR | QR | NFC |
| 14 | O | QR | BLE | BLE | BLE | QR |
| 15 | O | QR | NFC | NFC | NFC | QR |
| 16 | O | QR | BLE | BLE | BLE | NFC |

FIG. 5

SOFTWARE DEVELOPMENT KITS FOR POINT-OF-SALE DEVICE AND MOBILE DEVICE INTERACTIVE FRAMEWORKS

CROSS REFERENCE TO RELATED APPLICATIONS

This application is a continuation of U.S. application Ser. No. 16/884,031 filed May 26, 2020, which is a continuation of U.S. application Ser. No. 15/199,562 filed Jun. 30, 2016 and issued May 26, 2020 as U.S. Pat. No. 10,664,812, which claims the benefit of and priority to U.S. Provisional Patent Application Ser. No. 62/255,098, filed Nov. 13, 2015, which are incorporated by reference their entirety.

TECHNICAL FIELD

The present application generally relates to merchant and consumer configurable applications and more specifically to software development kits for point-of-sale device and mobile device interactive frameworks.

BACKGROUND

Current merchants may utilize electronic shopping and payment features in order to provide more friction-less experiences to users. Various features may be offered though merchant devices established at a location. These merchant devices may allow a merchant to interact with a user through the user's communication device in order to provide shopping experiences (e.g., item selection, advertisement, incentive offer, and/or checkout) and payment experiences (e.g., providing and processing a funding source and generating transaction receipts). However, current shopping and payment frameworks to provide these features and inflexible in their support and do not support more integrated approaches that allow a merchant and user to tailor their interaction and experience to the particular details of that transaction. For example, where a user may provide both "non-tender" (e.g., benefits, incentives, offers, loyalty programs, etc.) and "tenders" (e.g., credit/debit cards, payment accounts, and other electronic funding sources) in a transaction, the merchant often is required to proceed through disjointed point-of-sale interfaces and provide manual entry of information. Similarly, when a user selects a non-tender or a tender in a wallet application of their user device, the corresponding process on the user device and with the merchant's device does not properly update to provide seamless transaction processing.

BRIEF DESCRIPTION OF THE DRAWINGS

FIG. 5 is various protocols that may be used to implement the processes described herein, according to an embodiment.

Figure 1:
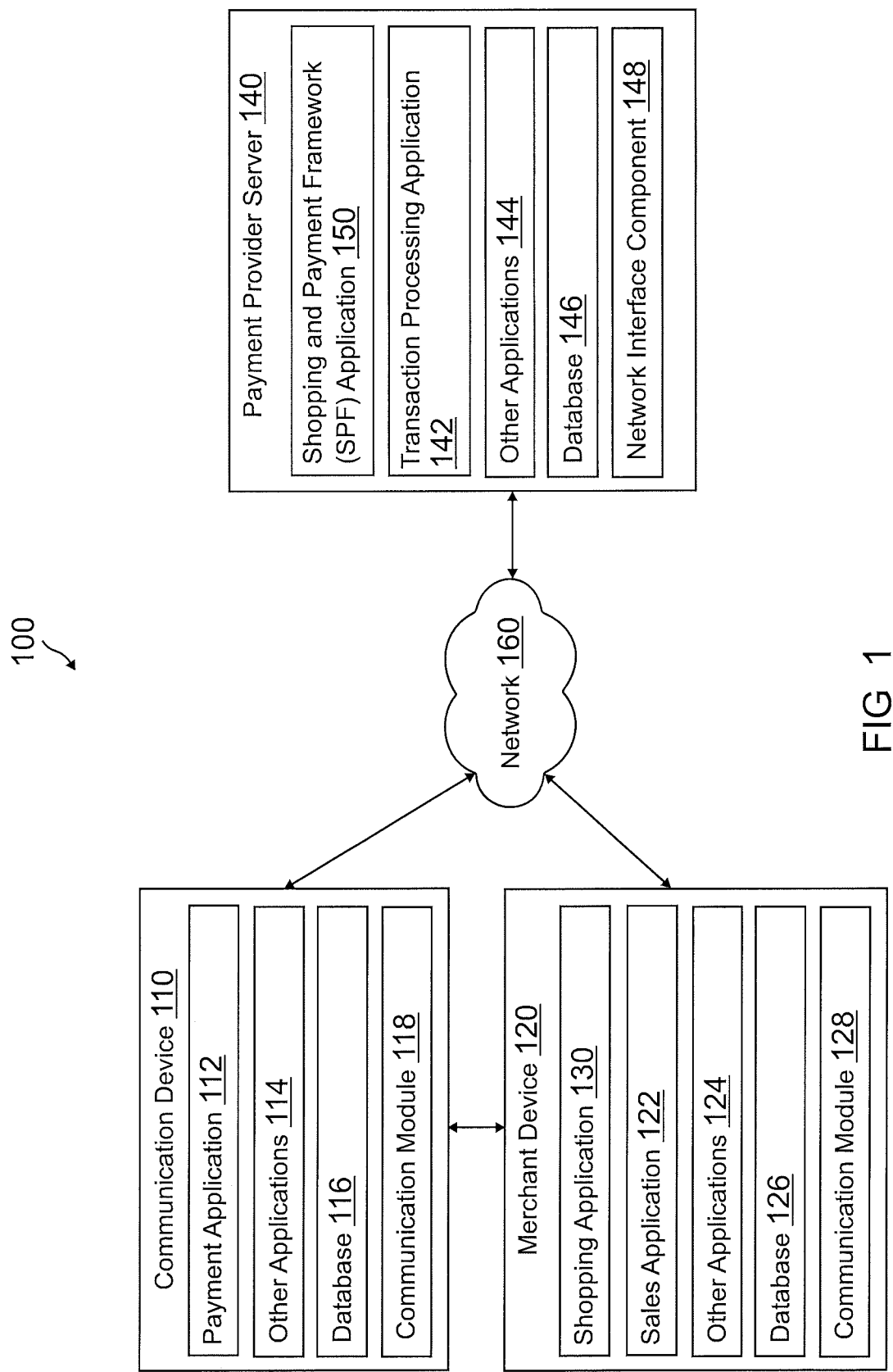
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for software development kits for point-of-sale device and mobile device interactive frameworks. Systems suitable for practicing methods of the present disclosure are also provided.

Merchants (e.g., a seller or payment receiver, such as a business, fundraiser, healthcare provider, landlord, etc.) may correspond to any person or entity selling goods and/or services (referred to herein as an "item" or "items") to other users/entities, such as buyers (e.g., a payer or payment sender, including a customer, donator, patient, renter, or other party). Service providers may include payment providers, which may provide payment services to one or more users for use with merchants. For example, a payment provider may provide a payment application to a user to provide payments to a merchant, which may be customizable by a merchant for use with the merchant's shopping and payment processes and features. Moreover, the payment provider may offer infrastructure, software, and/or other payment features to the merchant, which may be integrated into the merchant's system in order to process payments made by users.

In this regard, a payment provider may provide one or more software developments kits (SDK) and/or plugins, which may be used to determine and provide shopping and payment processes to a merchant. A merchant may utilize the payment provide to customize a flexible framework that may be utilized for shopping and/or payment with the merchant. In this regard, the framework may include integrations with consumer applications, for example, executable by a mobile device, which may utilize a digital wallet SDK that allows customization and use of the payment provider as a funding source by the merchant, where the payment provider may act as the digital wallet provider to users through one or more consumer applications. The framework may also include processes and features for use with merchant devices, including point-of-sale (POS) devices, wireless beacons (e.g., utilizing short range wireless communications with nearby devices, such as mobile phones), and/or other merchant devices and servers. Thus, the framework may include processes for execution by one or more of a communication device for a user and a merchant device for a merchant.

In this regard, the merchant SDK may correspond to an SDK or plugin for a merchant point-of-sale (POS) device that may provide features offered by the payment provider, including check-in services at a merchant location for a merchant. The check-in may be effectuated and processed using short range wireless communications by a communication device for the user with a device at the merchant location, such as over Bluetooth Low Energy, WiFi, NFC, Bluetooth, LTE Direct, or other communication technology protocol between the communication device and the merchant device. The check-in may also be processed by determining a location of the user and associating the location with the location of the merchant, which may be determined through user input to the user's communication device and/or using a GPS locator of the communication device. Once a check-in for the user is processed, the user may be associated with the location in order to provide various services to the user. In this regard, an identifier for the user may be provided to the merchant device and/or an identifier for the merchant may be provided to the user's communication device. Thus, the user may utilize the merchant's identifier during transaction processing to associate with a transaction by the merchant with a payment processor, while the merchant may utilize the user's identifier to find user information, provide incentives to the user's communication device, and/or access wallet information, including retrieval of funding source data based on a received funding source token, which may allow for transaction processing.

Additionally, the merchant SK/plugin and/or the digital wallet SDK for a consumer application may assist the user and the merchant during checkout and purchase of items. For example, a user may physically select items for purchase at a merchant location, where the merchant may utilize a POS device during checkout and purchase of the items (e.g., to scan and enter items into a transaction). The framework may assist the merchant with generation of transactions and transaction processing, including retrieval of funding sources from the digital wallet service provider (e.g., the payment provider) and transaction processing/payment resolution using a merchant payment data center and backend financial entities. In this regard, the framework may provide for scanning of items into a transaction and generating a transaction by a merchant device. For example, a POS device may include a scanner, reader, and/or interface to enter items selected by a user into a transaction. The POS device may further be used to calculate a total amount for the transaction and provide transaction details to the user, the merchant, and/or a merchant employee. The framework may provide for a process to communicate the total to the user's communication device, such as over NFC, BLE, QR code scanning, or other process.

Prior to generation of the transaction, the check-in may be used to provide benefits and/or incentives during shopping while at the merchant's location. For example, the merchant may detect that the user is located at the merchant's location. The merchant may then provider one or more "non-tenders" (e.g., benefits, incentives, offers, loyalty programs, etc.), which may be used by the user during shopping at the merchant's location. The non-tenders may be provided based on sales of the merchant and/or interests of the user. The non-tenders may also be particular to the items the user is browsing and/or entering into a transaction. Non-tenders may correspond to loyalty accounts and/or programs, which may require enrollment by the user with the merchant. Thus, various non-tenders may require the user to further provide user information to the merchant, for example, using a consumer application of the user's communication device. In other embodiments, the user may have additional non-tenders available for use with the merchant previously received from the merchant and/or available with a third party coupon, loyalty, gift card, or other benefit provider. The aforementioned non-tenders may be stored to a digital wallet for the user, which may be available through a cloud service, for example, one offered by a payment provider.

Additionally, the check-in may be used to determine transaction processing processes to be used by the merchant for processing the transaction. However, in other embodiments, the check-in may not be required, and the transaction processing processes may be determined by the framework on selection of one or more "tenders" (e.g., credit/debit cards, payment accounts, and other electronic funding sources) and/or non-tenders during a payment process for the transaction. In this regard, both tenders and non-tenders may be stored to a digital wallet of the user, where the digital wallet is serviced by the payment provider, which may offer a digital wallet based cloud infrastructure to users. Thus, a digital wallet cloud that supports, maintains, and allows access and use of the user's digital wallet may allow the user and the merchant to perform transaction processing through the digital wallet cloud and one or more payment hosts with a merchant data center that provides payments through backend payment processors (e.g., financial entities, such as banks, credit card providers, etc.). The merchant may communicate with the digital wallet cloud for the payment provider using the POS device framework established by the merchant SDK/plugin. In various embodiments, the merchant may become directly integrated with the payment provider (e.g., through agreements made between the merchant and the payment provider), which may provide direct communication with the payment provider and use of the payment provider as the payment processor and settlor for use of funding sources. However, in other embodiments, the merchant may instead be indirectly integrated with the payment provider, where the communication device and/or payment provider may instead provide tokenized data for tenders and/or non-tender that may be used by the merchant to resolve payments using the merchant data center's payment hosts.

Similarly, the consumer device SDK/plugin for a digital wallet and/or payment application may allow the user to perform actions with the digital wallet cloud, including storage of tender and/or non-tender information, receipt of tokens and/or other identifiers for one or more tenders and/or non-tenders, communication of tokens to a POS device through an acceptance mechanism (e.g., through a form factor such as QR code and/or barcode scanning or through short range wireless communications), and/or receipt and display of transaction information and tender/non-tender processing. Thus, a consumer application, such as a digital wallet application and/or payment application, may correspond to a configurable SDK and/or plugin available for a communication device of a user that allows the user to provide one or more tenders and/or non-tenders during checkout and transaction processing, and view results of processing and use of tenders and/or non-tenders during transaction processing. The application may execute on a communication device of the user, such as a mobile device that may be brought to the merchant location for the merchant. Thus, the application may include features and processes to first establish a digital wallet, for example, through provision of user information, financial information, and/or authentication credentials to the payment provider to generate and establish a digital wallet for the user. The application may communicate with the digital wallet cloud of the payment provider in order to access and maintain the digital wallet. Additionally, the user may communicate information for tenders and/or non-tenders to the digital wallet cloud for storage with the digital wallet. Additionally, the application may interface with the digital wallet cloud in order to receive tokens that identify funding sources, or other identification data that may identify a funding source and allow for transaction processing by a POS device through the token or other data. The tokens may be generated prior to transaction processing for a transaction between the user and the merchant, which may be stored to the digital wallet cloud for retrieval during transaction processing. However, in other embodiments, the application may interface with the digital wallet cloud to request generation of one or more tokens identifying one or more tenders and/or non-tenders. Moreover, in other embodiments, the token may be generated by the digital wallet cloud using backend payment processors for each funding instrument, such as a token including or identifying a payment card's primary account number (PAN).

Thus, at the start of a transaction, a user and/or merchant may scan or enter one or more items into the transaction using the POS device. The POS device may calculate a total and send the total to a connected payment terminal, which may accept one or more of QR code scanning, barcode scanning, NFC communications, BLE or Bluetooth communications, or other data entry mechanism. The transaction information, include a merchant identifier and/or user identifier may be transmitted to the digital wallet cloud of the payment provider in order to allow retrieval of transaction information by the application executing on the user's communication device. The user's communication device may then configure one or more processes to provide a funding source to the payment terminal in one of the accepted protocols by the payment terminal. The funding source may correspond to a tender or a non-tender available from the digital wallet of the user. Thus, a token or other data identifying the tender may be communicated to the payment terminal. The payment terminal may communicate the information for the funding source to the POS device, which may utilize the framework for transaction processing provided to the POS device to process a payment from the user to the merchant, for example, using a payment host with the merchant data center. The payment host may perform payment processing with a processor for the funding source, such as a financial entity or other payment processor, which may authorize the fixed amount to be charged to the funding source (e.g., by debiting an account of the user and crediting an account of the merchant for the fixed amount). The POS device may receive an indication of approval/denial of payment processing for the funding source, which may be applied to the transaction. In various embodiments, the token for a funding source may also be communicated by the POS device to the wallet provider cloud of the payment provider in order to retrieve information necessary for payment processing of the funding source using the payment host with the merchant data center. In other embodiments, the payment provider may provide payment processing, for example, where the merchant is integrated with the payment provider. Thus, once the total to be processed for a funding source and the funding source are provided to the wallet provider and/or processor (e.g., the payment provider server), the wallet provider and/or processor may process the total with the funding source, which may require backend communications with one or more payment card issuers or other financial institution. In other embodiments, processing the transaction may further require communication with a merchant payment hosting data center, for example, to process tenders and/or non-tenders provided in a transaction. In such embodiments, the funding source may be identified through a PAN or other identifier allowing for payment processing.

Thus, after processing of a funding source, the POS device may re-calculate the total for the transaction and update the payment terminal. For example, where one funding source is used, a transaction being processed may display a completed or paid message. However, where multiple tenders and/or non-tenders are to be provided during transaction processing, a new total may be displayed on the payment terminal. Once a funding source (e.g., tenders and/or non-tenders) is provided to a payment terminal, the POS device may recalculate the total after submission of the funding source to a wallet provider and/or processor. The total may be recalculated for one or more tenders and/or non-tenders after processing by the POS device. Additionally, the POS device may update the digital wallet cloud of the payment provider with the new total or other transaction information, which may be communicated to and/or retrieved by the application executing on the communication device of the user. The user may then select another tender or non-tender, and perform transaction processing. In other embodiments, the user may select multiple tenders and/or non-tenders and communicate the selected funding sources in a single data package bundled together.

System 100 includes a communication device 110, a merchant device 120, and a payment provider server 140 in communication over a network 160. A user (not shown) may establish a user payment account with payment provider server 140, which may be used to provide payments to a merchant (not shown) associated with merchant device 120 through a merchant payment account. Additionally, the merchant may utilize services offered by payment provider server 140 in order to generate a flexible shopping and payment framework for use with communication device 110 and merchant device 120. The merchant may specify one or more processes for execution by the framework using communication device 110 and/or merchant device 120. The processes may include shopping processes (e.g., advertisement, offers of non-tenders, item selection, transaction generation, and/or checkout) and payment processes (e.g., processing of non-tenders and tenders provided by a user). Payment provider server 140 may determine the framework and may provide various software and other features (including device hardware, such as wireless beacons) for use by the merchant. Payment provider server 140 may also provide a configurable consumer application executable by communication device 110 and processes for execution by merchant device 120.

Communication device 110, merchant device 120, and payment provider server 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

Communication device 110 may be implemented as a communication device that may utilize appropriate hardware and software configured for wired and/or wireless communication with payment provider server 140 and/or merchant device 120. For example, in one embodiment, communication device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although a communication device is shown, the communication device may be managed or controlled by any suitable processing device. Although only one communication device is shown, a plurality of communication devices may function similarly.

Communication device 110 of FIG. 1 contains a payment application 112, other applications 114, a database 116, and a network interface component 118. Browser/payment application 112 and other applications 114 may correspond to executable processes, procedures, and/or applications with associated hardware. In other embodiments, communication device 110 may include additional or different modules having specialized hardware and/or software as required.

Payment application 112 may correspond to one or more processes to execute modules and associated devices of communication device 110 to initiate, receive, and/or process/complete transactions using services provided by payment provider server 140. In this regard, payment application 112 may correspond to specialized hardware and/or software utilized by communication device 110 to provide an interface to permit the user associated with communication device 110 to select payment options and provide payment for items, for example, to a merchant through merchant device 120 using payment provider server 140. In various embodiments, payment application 112 may also provide payments and/or transfers to users and/or groups of users, for example, payments to individual sellers or friends for items and/or transfers between known associates. Payment application 112 may be implemented as a user interface enabling the user to enter payment options for storage by communication device 110, select and provide payment options on checkout/payment of one or more items with a merchant, and complete a transaction for the item(s) through a purchase request for the item(s). In various embodiments, payment application 112 may include a general browser application configured to retrieve, present, and communicate information over the Internet (e.g., utilize resources on the Internet) or a private network, which may be configured to access a website or webpage of payment provider server 140 in order to execute one or more of the transaction processing processes described herein. In other embodiments, payment application 112 may include a dedicated application of payment provider server 140 or other entity (e.g., a merchant associated with merchant device 120), which may be configured to assist in processing transactions.

As discussed herein, payment provider server 140 may be used to provide payment to the merchant associated with merchant device 120. Payment application 112 may be dynamic and otherwise flexible to provide various features of a shopping and payment framework to the user of communication device 110. In this regard, payment application 112 may provide check-in processes to check a user into a merchant location using location information for the user and/or short range wireless communications. In other embodiments, the check-in may be performed through user input to payment application 112 with an online check-in service, including payment provider server 140 and/or another service provider. The check-in may be used to communicate an identifier for the user and/or communication device 110 to merchant device 120 for associated with a transaction and/or retrieval of digital wallet data, tokens, and/or stored funding source information from a digital wallet of the user with payment provider server 140 (e.g., available using a digital wallet cloud service). In other embodiments, payment application 112 may utilize the check-in to receive information, including merchant information and/or non-tenders for use during transaction processing as a funding source and reduction of a transaction total. Thus, payment application 112 may receive advertisements during a shopping session with the merchant and may receive benefits, incentives, or other coupons while at the merchant location.

Additionally, payment application 112 may be used during checkout for a transaction with the merchant. In such embodiments, payment application 112 may provide a payment to the merchant through merchant device 120 using a funding source selected by the user through a graphical user interface provided by payment application 112 using a display component of communication device 110. Payment application 112 may be configurable to adjust transaction processing processes during checkout and payment for a transaction, for example, a form factor for communication of funding source data (e.g., a token corresponding to a funding source) and/or a communication protocol for communication of the funding source data. Thus, payment application 112 may be adjusted to communicate through various protocols (e.g., QR code, barcode, NFC, BLE) for transaction processing depending on the acceptance capabilities and/or processes for merchant device 120 including a payment terminal associated with merchant device 120. Payment application 112 may also allow for multi-tenders (e.g., a plurality of funding sources, such as tender payment cards and/or non-tender incentives or benefits) as well as rich payments (e.g., through offers by the merchant, coupons, and/or loyalty programs), which may be done by payment application 112 instead of through manual entry. Payment application 112 may allow preferred funding preferences and may allow the user to select both the tenders and the non-tenders for use in transaction processing. Such data may be communicated through a token, identifier, or other data package that may allow merchant device 120 to retrieve payment processing information for the tender/non-tender from payment provider server 140 and/or process with a merchant data center having a payment host in communication with backend electronic financial entities that provide payment processing.

Thus, the merchant may receive funding source information from payment application 112 over the selected and configured communication channel. Thus, payment application 112 may be utilized to select funding source(s) for use during a transaction between the user and the merchant. Payment application 112 may utilize user financial information, such as a credit card, bank account, or other financial account, as a funding source when providing payment information for use in the authentication mechanism. Additionally, payment application 112 may utilize a user account with payment provider, such as payment provider server 140, as the funding source. Non-tenders may also be provided during payment processing, which may be received from the merchant (e.g., from merchant device 120 and/or another non-tender provider). The user may therefore cause a transaction to be generated that includes a transaction processing request with the merchant for one or more items for purchase. Payment application 112 may be used to receive a merchant identifier during transaction processing, which may be communicated to a digital wallet cloud having transactions for processing provided by payment provider server 140. Communication of the merchant identifier to payment provider server 140 may allow synchronization of the transaction with payment application 112 and retrieval of wallet tokens for the selected tenders/non-tenders. During transaction processing, the tender and/or non-tender may be communicated to merchant device 120 for processing. Payment application 112 may update information for a digital wallet stored to communication device 110 (e.g., accessible using payment application 112) of selection of the tenders and/or non-tenders. Additionally, after processing of each tender/non-tender, of all the tenders/non-tenders, and/or other updated transaction information, payment application 112 may receive the updated transaction information and/or tender/non-tender information through a graphical user interface output by payment application 112. Thus, payment application 112 may be utilized to view the results of the transaction and/or for viewing and storage of a transaction history, such as a receipt.

In various embodiments, communication device 110 includes other applications 114 as may be desired in particular embodiments to provide features to communication device 110. For example, other applications 114 may include security applications for implementing client-side security features, programmatic client applications for interfacing with appropriate application programming interfaces (APIs) over network 160, or other types of applications. Other applications 114 may also include email, texting, voice and IM applications that allow a user to send and receive emails, calls, texts, and other notifications through network 160. In various embodiments, other applications 114 may include financial applications, such as banking, online payments, money transfer, or other applications. Other applications 114 may also include other location detection applications, such as a mapping, compass, and/or GPS application. Other applications may include social networking applications and/or merchant applications. Other applications 114 may include device interfaces and other display modules that may receive input and/or output information. For example, other applications 114 may contain software programs, executable by a processor, including a graphical user interface (GUI) configured to provide an interface to the user.

Communication device 110 may further include database 116 stored to a transitory and/or non-transitory memory of communication device 110, which may store various applications and data and be utilized during execution of various modules of communication device 110. Thus, database 116 may include, for example, identifiers such as operating system registry entries, cookies associated with browser/payment application 112 and/or other applications 114, identifiers associated with hardware of communication device 110, or other appropriate identifiers, such as identifiers used for payment/user/device authentication or identification. Information for execution of payment application 112 may be stored to database 116, including processes and features of an application framework that may be adjusted depending on a shopping and/or payment experience. Database 116 may include transaction information, as well as funding sources for a transaction. Additionally, received transaction histories may be stored to database 116.

Communication device 110 includes at least one network interface component 118 adapted to communicate with merchant device 120 and/or payment provider server 140. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Merchant device 120 may be maintained, for example, by a merchant or other entity selling one or more items to users, which may include a single merchant or groups of merchants, as well as small and large branded merchants. Merchant device 120 may also interact with payment provider server 140 to provide the items for sale, including use of various software, infrastructure, websites, applications, and/or other framework features for a shopping and payment experience with the merchant. In this regard, merchant device 120 may include processing applications, which may be configured to interact with communication device 110 and/or payment provider server 140 to engage in transactions. Merchant device 120 may be implemented using any appropriate hardware and software configured for wired and/or wireless communication with communication device 110 and/or payment provider server 140. For example, in one embodiment, merchant device 120 may be implemented as a single or networked personal computer (PC), a smart phone, laptop computer, wearable computing device, and/or other types of computing devices at a merchant location capable of transmitting and/or receiving data. Although a merchant device is shown, the merchant device may be managed or controlled by any suitable processing device. Although only one merchant device is shown, a plurality of merchant devices may function similarly.

Merchant device 120 of FIG. 1 contains a shopping application 130, sales application 122, other applications 124, a database 126, and a communication module 128. Shopping application 130, sales application 122 and other applications 124 may correspond to processes, procedures, and/or applications executable by a hardware processor, for example, a software program. In other embodiments, merchant device 120 may include additional or different modules having specialized hardware and/or software as required.

Shopping application 130 may correspond to one or more processes to execute modules and associated specialized hardware of merchant device 120 that provide shopping and checkout features to a user associated with communication device 110 by a merchant associated with merchant device 120. In this regard, shopping application 130 may correspond to specialized hardware and/or software of merchant device 120 to provide various shopping experiences to a user. For example, sales application 122 may be implemented as an application offering items for sale that may be accessed by a merchant to enter items for sales and/or provide incentives, benefits, and/or loyalty accounts to users. Thus, shopping application 130 may correspond to a flexible framework application to provide various shopping features, which may include item advertisement and/or merchant advertisement to the user. Shopping application 130 may process a check-in for the user through receive a location of the user from communication device 110 and/or short range wireless communications. Thus, shopping application 130 may be configured to adjust to various communication protocols (e.g., BLE, NFC, QR code scanning, etc.). Once the user is checked-in with the merchant, shopping application 130 may provide advertisements to the user. Additionally, shopping application 130 may also offers, coupons, loyalty, and other incentives to the user through the communications. Thus, shopping application 130 may be used to generate non-tenders and provide non-tenders for use to users. The non-tenders may be retrieved prior to shopping with the merchant and stored to a digital wallet. However, in other embodiments, the non-tenders may be provided during check-in by communication device 110 and/or during transaction processing. Such non-tenders may be utilized during transaction processing by sales application 122 with payment provider server 140 and/or another payment host utilized by a merchant data center for payment processing. The merchant may also prioritize their non-tenders during checkout at merchant device 120 over third party tenders, for example, by applying the non-tenders available with shopping application 130 to a transaction at checkout prior to transaction processing with one or more payment hosts at a merchant data center. Shopping application 130 may allow for entry of items for purchase to a transaction through configurable mechanisms, including physical scanning and receive electronic item selection. Once the transaction is generated, shopping application 130 may utilize sales application to process the transaction.

Thus, sales application 122 may correspond to one or more processes to execute modules and associated specialized hardware of merchant device 120 that provide checkout and payment processes for a transaction to purchase one or more items for sale from the merchant corresponding to merchant device 120. In this regard, sales application 122 may correspond to specialized hardware and/or software of merchant device 120 to provide a convenient interface to permit a merchant to process items for sale in a transaction. Thus, sales application 122 may be used to establish a transaction once the user associated with communication device 110 has selected one or more items for purchase. Sales application 122 may determine a total for the transaction, which may include any additional fees, taxes, tips, or other costs. Once a payment amount is determined for the transaction for the item(s) to be purchased by user 102, sales application 122 may request payment from user 102 by providing the total to a payment terminal and requesting the user provide one or more tender or non-tender during transaction processing to provide a payment to the merchant. Thus, a flexible software framework for sales application 122 may be determine by payment provider server 140, which may be implemented with sales application 122 to accept and process tenders/non-tenders and perform processing of the tenders/non-tenders.

Sales application 122 may receive payment processing information, such as a funding source (e.g., a non-tender and/or tender). Sales application 122 may accept single tender/non-tender provision during transaction processing, or may accept multi-tenders during transaction processing as well as rich payments through offers, coupons, and/or loyalty. Sales application 122 may be adjustable to accept various data input protocols, including QR code/barcode scanning, NFC, and/or BLE. Sales application 122 may be configured based on the communication mechanisms accepted by the payment terminal and/or available with communication device 110. Once a communication mechanism is determined, sales application 122 may utilize the mechanism to send and/or receive data between merchant device 120 and communication device 110. In various embodiments, sales application 122 may prepare the payment terminal with a QR code or communication protocol to provide communication device 110 with a merchant identifier and/or pair with communication device 110. The merchant identifier may be used to synchronize a transaction established by sales application 122 with payment provider server 140 (e.g., using the digital wallet cloud) and communication device 110 for updating communication device 110 with transaction information and receipt of further tenders/non-tenders during transaction processing.

Sales application 122 may utilize payment provider server 140 as the wallet provider and tender/non-tender processor for the transaction. In this regard, after a transaction is generated using sales application 122, the transaction and/or transaction information (including a merchant identifier) may be exposed to a digital wallet cloud for synchronization to communication device 110. Sales application 122 may provide a total to a payment terminal connected to merchant device 120, which may allow for entry of multiple tenders and rich payments using offers, coupons, and/or loyalty. Sales application 122 may be platform agnostic to accept entry of tenders/non-tenders through various communication protocols accepted by the payment terminal. Thus, the user of communication device 110 may communicate a tender or a non-tender to merchant device 120 through the payment terminal, which may be processed by sales application 122. A non-tender available with the merchant may be prioritized and applied at merchant device 120 using merchant data for non-tenders available with the merchant (e.g., merchant coupons, offers, and/or loyalty). In further embodiments, a non-tender may also be processed through payment provider server 140 by retrieving cloud-based data from a digital wallet of the user in the digital wallet cloud provided by payment provider server 140, which may include data necessary to resolve a non-tender with a third party offer, coupon, or loyalty provider. The merchant may then utilize a merchant data center that includes one or more payment hosts to communicate with the third party and receive authorization and/or processing of the non-tender. Where a tender is provided, sales application 122 may similarly communicate with the digital wallet cloud to retrieve tender data stored to the user's digital wallet, and communicate the tender data to a payment host. In other embodiments where the merchant is directly integrated with payment provider server 140 for transaction processing, payment provider server 140 may be utilized by sales application 122 as the payment processor, which may provide payment to an account of the user and update merchant device 120 of the transaction processing results. Sales application 122 may then update the digital wallet of the user in the digital wallet cloud of transaction processing results and total cost changes, which may be reflected on communication device 110. Additionally, sales application 122 may then the results of the transaction processing, and complete the transaction with the user, for example, by providing the user the items for the transaction or declining the transaction where user 102 is not authenticated or the transaction is not authorized (e.g., insufficient funds).

Merchant device 120 includes other applications 124 as may be desired in particular embodiments to provide features to merchant device 120. For example, other applications 124 may include security applications for implementing client-side security features, programmatic client applications for interfacing with appropriate application programming interfaces (APIs) over network 160, or other types of applications. Other applications 124 may also include email, texting, voice and IM applications that allow a user to send and receive emails, calls, texts, and other notifications through network 160. In various embodiments, other applications 124 may include financial applications, such as banking, online payments, money transfer, or other applications associated with payment provider server 140. Other applications 144 may contain software programs, executable by a processor, including a graphical user interface (GUI) configured to provide an interface to the user.

Merchant device 120 may further include database 126 which may include, for example, identifiers such as operating system registry entries, cookies associated with sales application 122 and/or other applications 124, identifiers associated with hardware of merchant device 120, or other appropriate identifiers, such as identifiers used for payment/user/device authentication or identification. Identifiers in database 126 may be used by a payment/credit provider, such as payment provider server 140, to associate merchant device 120 with a particular account maintained by the payment/credit provider. Item information for items sold by the merchant associated with merchant device 120 may be stored to database 126. Database 126 may further include transaction information and/or results, including transaction histories. Additionally, a framework utilized by shopping application 130 and/or sales application 122 may be stored to database 126, which may be utilized during transaction processing to receive entry of tenders and/or non-tenders, including multi-tender payments (e.g., through multiple payment cards and/or accounts) and rich payments (e.g., using coupons, offers, and/or loyalty, which may be offered by the merchant and/or a third party).

Merchant device 120 includes at least one communication module 128 adapted to communicate with communication device 110 and/or payment provider server 140. In various embodiments, communication module 128 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Payment provider server 140 may be maintained, for example, by an online payment service provider, which may provide payment services and/or processing for financial transactions on behalf of users. In this regard, payment provider server 140 includes one or more processing applications which may be configured to interact with communication device 110, merchant device 120, and/or partner platform server 130 to facilitate payment for a transaction, including establishment of payment accounts and payments for a transaction between a user and a merchant and split fee amounts for the merchant's use of a partner service's platform to generate the transaction. In one example, payment provider server 140 may be provided by PAYPAL®, Inc. of San Jose, CA, USA However, in other embodiments, payment provider server 140 may be maintained by or include a credit provider, financial services provider, financial data provider, and/or other service provider, which may provide payment services to the user.

Payment provider server 140 of FIG. 1 includes a shopping and payment framework (SPF) application 150, a transaction processing application 142, other applications 144, a database 146, and a network interface component 148. SPF application 150, transaction processing application 142, and other applications 144 may correspond to executable processes, procedures, and/or applications with associated hardware. In other embodiments, payment provider server 140 may include additional or different modules having specialized hardware and/or software as required.

SPF application 150 may correspond to one or more processes to execute modules and associated specialized hardware of payment provider server 140 to provide shopping and payment frameworks to merchants and users, which may be flexible to support various features and experiences between the merchant and the user. In this regard, SPF application 150 may correspond to specialized hardware and/or software to receive a request to establish a transaction processing framework for a merchant, such as the merchant associated with merchant device 120. The request may include preferences and parameters for establishment of the framework, including the shopping and payment features available with merchant device 120 (e.g., form factors and/or communication protocols usable by a payment terminal connected to merchant device 120, benefits and loyalty available with the merchant, direct or indirect integration by the merchant with payment provider server 140, etc). Using merchant transaction processing information and consumer application experience information. SPF application 150 may determine a flexible framework for shopping and payment experiences for merchant device 120, as well as a customizable consumer application for execution by communication device 110. The merchant transaction processing information may comprise merchant configurable payment capabilities for various transaction processing experiences (e.g., different transaction processing processes and executable instructions), and the consumer application experience information may comprise consumer configurable options for a consumer application for a merchant for use with the merchant's framework.

As discussed herein, the shopping framework determined by SPF application 150 may include options for check-in at a merchant location using various communication protocols and/or processes (e.g., NFC, BLE, QR code scanning, etc.). The shopping framework may allow for item entry to a transaction through electronic selection and/or physical scanning, as well as providing non-tenders to users and processing the non-tenders. The shopping framework may allow for generation of a transaction, which may be processed using a payment framework. The payment framework may be flexible to allow for processing of various tenders and/or non-tenders through entities, such as a merchant server including a merchant data center and associated payment hosts for a credit issuer or other financial institution and/or payment provider server 140. The payment framework may allow for tokenized payments, which may utilize payment provider server 140 and/or network tokens for the credit issuer or other financial institution. Thus, the payment framework may utilize payment provider server 140 as a wallet provider and transaction processor for a tender. The payment framework may also process multi-tender transactions and rich payments using non-tenders.

SPF application 150 may also be utilized to determine a consumer application for use by a user associated with communication device 110 with the merchant associated with merchant device 120. In this regard, the consumer application (e.g., payment application 112) may include processes to utilize the flexible framework determined for the merchant. Thus, the consumer application may include processes to establish a check-in for the user (e.g., using a location of the user/communication device 110 and/or through short range wireless communications). The consumer application may also be used to receive non-tenders from merchant device 120 and present the non-tenders during checkout and payment for a transaction. Thus, the consumer application may include processes to utilize a form factor or communication protocol to provide tokenized data of a tender and/or non-tender to merchant device 120. The consumer application may be utilized to establish and/or access a digital wallet of a user, as well as receive wallet updates from a digital wallet cloud corresponding to the digital wallet. During checkout and payment, the consumer application may be configured to access an online wallet provided by payment provider server 140 and provide one or more tenders for payment of the transaction.

Transaction processing application 142 may correspond to one or more processes to execute modules and associated specialized hardware of payment provider server 140 to receive and/or transmit information from communication device 110 for establishing payment accounts, as well as processing and completing of one or more financial transaction initiated using the payment accounts and/or associated digital wallets. In this regard, transaction processing application 142 may correspond to specialized hardware and/or software to establish payment accounts having digital wallets, which may be utilized to send and receive payments and monetary transfers and engage in other financial transactions. A user associated with communication device 110 may establish a payment account with transaction processing application 142 by providing personal and/or financial information to payment provider server 140 and selecting an account login, password, and other security information. Similarly, the merchant associated with merchant device 120 may provide merchant information and financial information. The payment accounts may be used to send and receive payments using one or more tenders. The payment accounts may correspond to an online digital wallet, where payment provider server 140 acts as the wallet provider, payment account maintainer, and transaction processor. Thus, transaction processing application 142 may also act as a cloud based wallet provider that may provide digital wallet services to users and merchants, for example, to provide tokens to communication device 110 and/or funding source information to merchant device 120. The payment accounts may be accessed and/or used through a browser application and/or dedicated payment application executed by communication device 110. Transaction processing application 142 may receive a payment request from merchant device 120 for a transaction between the user and the merchant. The payment request may include transaction terms and a funding source identified by the user, which may include tenders and/or non-tender. The payment request may previously be processed using non-tenders provided by the merchant by merchant device 120 and/or other merchant's server. However, in other embodiments, transaction processing application 142 may also be used to process non-tenders and/or engage in multi-tender transactions. Transaction processing application 142 may provide payment to the merchant using the tenders and/or non-tenders, and may provide a transaction history to communication device 110, merchant device 120, or store the history with one or more accounts. The payment may be provided to the merchant's payment account with payment provider server 140.

In various embodiments, payment provider server 140 includes other applications 144 as may be desired in particular embodiments to provide features to payment provider server 140. For example, other applications 144 may include security applications for implementing server-side security features, programmatic client applications for interfacing with appropriate application programming interfaces (APIs) over network 160, or other types of applications. Other applications 144 may contain software programs, executable by a processor, including a graphical user interface (GUI), configured to provide an interface to the user when accessing payment provider server 140. In various embodiments where not provided by transaction processing application 142, other applications 144 may include connection and/or communication applications, which may be utilized to communicate information to over network 160.

Additionally, payment provider server 140 includes database 146. As previously discussed, the entity corresponding to communication device 110 and/or merchant device 120 may establish one or more payment accounts with payment provider server 140. Payment accounts in database 146 may include entity information, such as name, address, birthdate, merchant information, partner information, payment/funding information, additional user financial information, and/ or other desired user data. The entity may link to their respective payment accounts through an account, user, merchant, partner, and/or device identifier. Thus, when an identifier is transmitted to payment provider server 140, e.g. from communication device 110 and/or merchant device 120, a payment account belonging to the entity may be found. Additionally, database 146 may include data related to a framework established for communication device 110 and/or merchant device 120.

In various embodiments, payment provider server 140 includes at least one network interface component 148 adapted to communicate communication device 110 and/or merchant device 120 over network 160. In various embodiments, network interface component 148 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 100.

Figure 2:
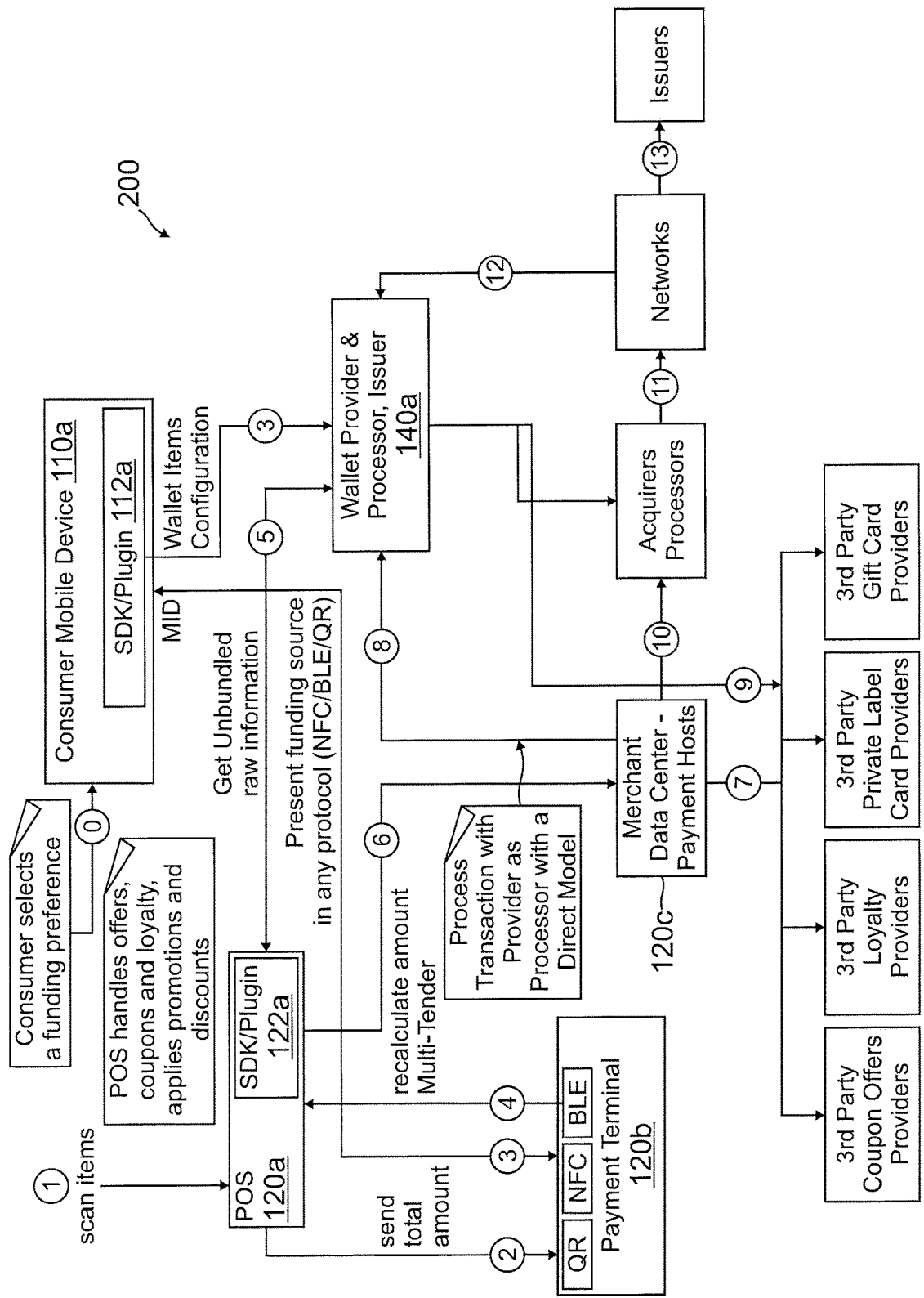
FIG. 2 is an exemplary flowchart of transaction processing using a transaction processing framework determined for a merchant device with a consumer application of a communication device, according to an embodiment.

FIG. 2 is an exemplary flowchart of transaction processing using a transaction processing framework determined for a merchant device with a consumer application of a communication device, according to an embodiment. In this regard, environment 200 of FIG. 2 includes a consumer mobile device 110a and a wallet provider 140a corresponding generally to the described features and processes of communication device 110 and payment provider server 140, respectively, in environment 100 of FIG. 1. Additionally, environment 200 includes a POS device 120a, a payment terminal 120b, and a merchant data center-payment host 120c corresponding generally to the described features and processes of merchant device 120 in environment 100 of FIG. 1.

In this regard, a user may select a funding preference at step 0, for example, using SDK/plugin 112a that may provide features and processes described in reference to payment application 112 in environment 100 of FIG. 1. The selection may be through one or more application interfaces, and may correspond to a selection of one or more tenders or non-tenders for use in transaction processing. SDK/plugin 112a may update a digital wallet of consumer mobile device 110a based on the selections, which may then be utilized by SDK/plugin 112a to initiate a form factor and/or communication protocol to transmit a token corresponding to the selected tender or non-tender to POS device 120a through payment terminal 120b. In order to generate the transaction, the user and/or a merchant associated with POS device 120a may scan one or more items into POS device 120a at step 1. POS device 120a may determine a total cost for the transaction, and output the cost to payment terminal 120b for display to the user and request for a funding source. Additionally, POS device 120a may also apply and process merchant non-tenders, such as coupons, loyalty, and/or offers prior to additional transaction processing.

Thus, at step 3, SDK/plugin 112a may configure consumer mobile device 110a to communicate with payment terminal 120b utilizing one or more of the acceptance mechanisms of payment terminal 120b, such as QR/barcode scanning, NFC, and/or BLE. SDK/plugin 112a may then present a funding source to payment terminal 120b utilizing the selected protocol by SDK/plugin 112a and accepted by payment terminal 120b. Payment terminal 120b may communicate the received tender and/or non-tender information to POS device 120*a* for processing to receive a payment for the transaction at step 4. An SDK/plugin 122*a* corresponding generally to the features and processes described in reference to shopping application 130 and sales application 122 may configure POS device 120*a* to process the received tender/non-tender information using the protocol selected during step 3. Thus, SDK/plugin 122*a* may utilize the received information for the tender/non-tender to determine a payment processing process to utilize, as well as retrieve digital wallet data for the tender/non-tender available from the digital wallet cloud provided by wallet provider 140*a* if necessary. Where the payment corresponds to a multi-tender transaction having multiple processing of tenders, a recalculation of the amount may occur so that an updated amount is shown on payment terminal 120*b*. Additionally, if the non-tender correspond to a merchant non-tender that may be applied at POS device 120*a*, SDK/plugin 122*a* may allow for processing of the non-tender and updating of the transaction prior to further processing of tenders and third party non-tenders.

Where a multi-tender transaction having a single bundle of the multiple tenders may occur and/or rich payments having multiple non-tenders bundled together may be provided to POS device 120*a* from payment terminal 120*b*, at step 5, unbundled raw data for the tenders and/or non-tenders may be retrieved from wallet provider 140*a*. In other embodiments, where the tender/non-tender is available to be processed, SDK/plugin 122*a* may communicate the tender/non-tender data to merchant data center-payment host 120*c*. Merchant data center-payment host 120*c* may be utilized to perform payment processing by communicating with one or more entities to process tenders and/or non-tenders. In this regard, merchant data center-payment host 120*c* may provide different payment processing depending on whether the merchant is directly integrated with wallet provider 140*a* (e.g., has established agreements for payment processing) or is indirectly integrated and processes tenders and/or non-tenders utilizing wallet provider tokens and network tokens for funding sources. For example, at step 7, POS device 120*a* may request that merchant data center-payment host 120*c* request that the third party tenders and/or non-tender may be resolved with the third parties where a token is provided that identifies the funding source (e.g., through wallet provider 140*a* as the network tokens that are co-issued between third parties and/or financial entities, such as a token for a 16 digit PAN of a credit/debit card, or a network token for a partner financial entity or third party). Merchant data center-payment host 120*c* may also communicate with acquirer's processor for such a funding source using the token identifying the funding source, at step 10, which may communicate with networks at step 11 and provide processing information back to wallet provider 140*a* at step 12 and issuers of the funding source at step 13.

In other embodiments, merchant data center-payment host 120*c* may communicate with wallet provider 140*a*, for example, where wallet tokens are provided and wallet provider 140*a* is directly integrated with the merchant as the payment processor, at step 8. In such embodiments, wallet provider 140*a* may process the transaction with merchant data center-payment host 120*c* and POS device 120*a* with wallet provider 140*a* as the payment processor. In this regard, wallet provider 140*a* may communicate with the third parties and/or payment processors (e.g., financial entities) at step 9. Similarly, where a tender is processed by acquirer's processors and through networks at step 11, wallet provider 140*a* may receive the results of transaction processing to update the digital wallet of the user in the digital wallet cloud at step 12, which may similarly be provided to issuers at step 13.

Figure 3:
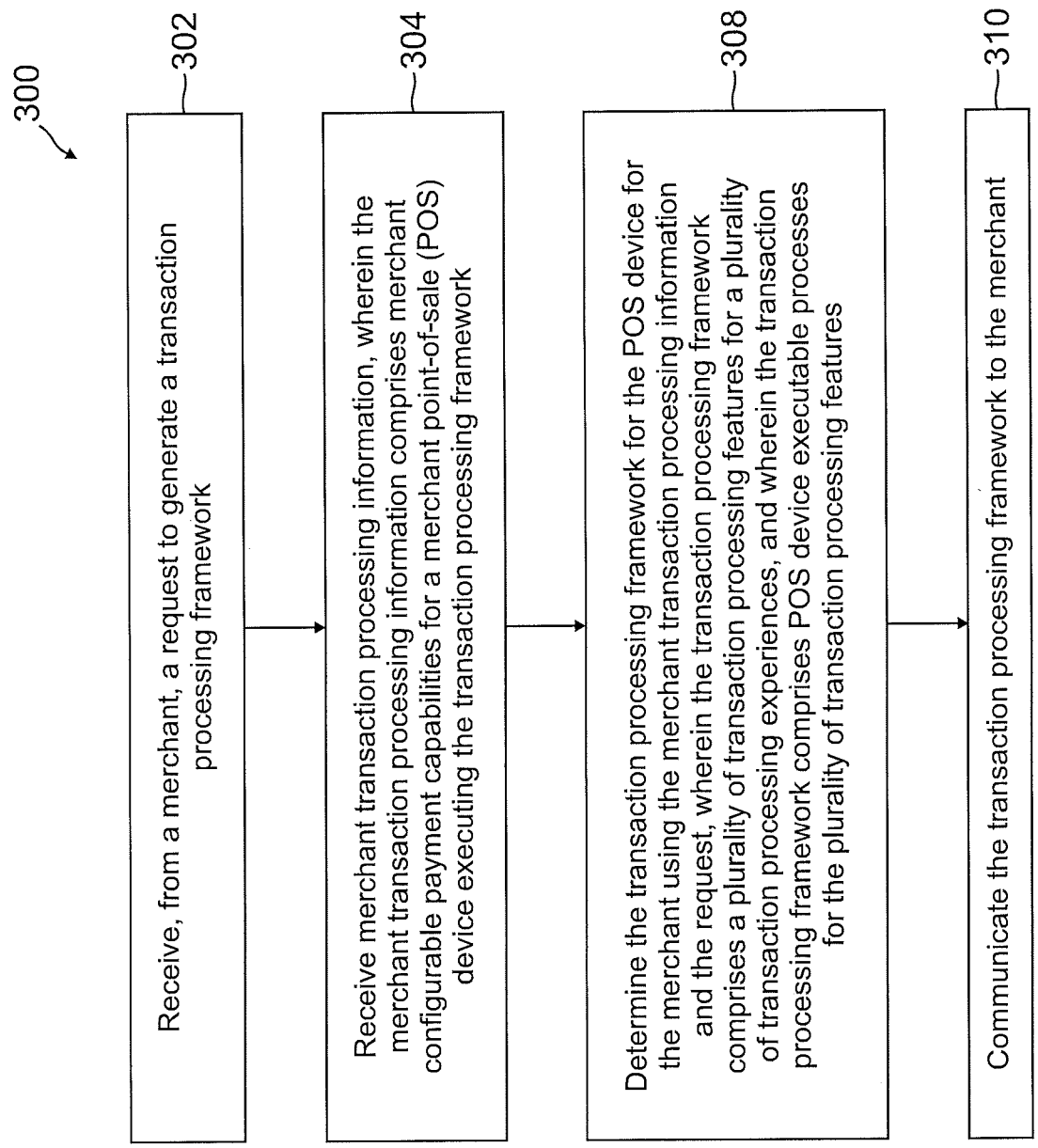
FIG. 3 is an exemplary process flowchart for software development kits for point-of-sale device and mobile device interactive frameworks, according to an embodiment.

FIG. 3 is an exemplary process flowchart for software development kits for point-of-sale device and mobile device interactive frameworks, according to an embodiment. Note that one or more steps, processes, and methods described herein may be omitted, performed in a different sequence, or combined as desired or appropriate.

At step 302, a request to generate a transaction processing framework is received, from a merchant. Merchant transaction processing information is received, wherein the merchant transaction processing information comprises merchant configurable payment capabilities for a merchant point-of-sale (POS) device executing the transaction processing framework, at step 304. At step 306, the transaction processing framework for the POS device for the merchant is determined using the merchant transaction processing information and the request, wherein the transaction processing framework comprises a plurality of transaction processing features for a plurality of transaction processing experiences, and wherein the transaction processing framework comprises POS device executable processes for the plurality of transaction processing features. At least one of the plurality of transaction processing experiences may comprise information entry of a tender or a non-tender to a transaction, and wherein the plurality of transaction processing features comprise the information entry using at least one of QR code scanning, barcode scanning, near field communications, Bluetooth communications, or Bluetooth Low Energy communications. At least one of the plurality of transaction processing features may comprise available usage of a plurality of tenders or non-tenders in transactions with the merchant, and wherein the plurality of transaction processing features comprise entry processes for the plurality of tenders or non-tenders using the POS device in the transactions Thus, at step 308, the transaction processing framework is communicated to the merchant. The transaction processing framework may comprise a check-in process to establish a check-in for the user with the merchant using a communication device of the user. The transaction processing framework may comprise at least one process to configure the payment terminal to communicate with the communication device of the user using one of QR code scanning, barcode scanning, near field communications, Bluetooth communications, and Bluetooth Low Energy communications.

In various embodiments, a digital wallet may be provided to a user associated with a transaction between the user and the merchant, wherein the digital wallet stores at least one of the plurality of tenders or non-tenders usable in the transaction. A non-tender may comprise at least one of a coupon, a discount, an offer, or a loyalty account, while a tender may comprise a debit card, a credit card, a payment account, or a gift card, and wherein the POS device communicates with a merchant data center to process the more than one tender or non-tender. Additionally, consumer application experience information for a consumer application executing on a mobile device of the user may be determined, wherein the consumer application experience information comprises user configurable options for transaction processing of the transaction using the consumer application, and mobile device executable processes of the consumer application may be configured with at least one of the user configurable options based on the transaction processing request and the transaction processing framework for the merchant. The consumer application may also be provided to the mobile device of the user. The user configurable options may comprise use of more than one tender or non-tender during processing of the transaction to provide a payment from the user to the merchant, and wherein the mobile device executable processes comprise at least one process to present the more than one tender or non-tender to the POS device during processing of the transaction.

The user may select the more than one tender or non-tender using a graphical user interface of the consumer application one at a time during processing of the transaction, wherein the consumer application communicates each of the more than one tender or non-tender at individual times to the POS device. Thus, the consumer application on the mobile device may be updated with a status based on processing of the transaction using the more than one tender or non-tender. In various embodiments, one of the user or the merchant may select a communication protocol for transmission of the more than one tender or non-tender based on the merchant configurable payment capabilities and the user configurable option, wherein the consumer application configures the communication device to transmit the more than one tender or non-tender to the POS device using the communication protocol. In various embodiments, the consumer application may bundle the more than one tender or non-tender into a data package for the POS device in a single data transmission.

The POS device may receive transaction information for a transaction between the merchant and a user, displays, using a payment terminal, a total amount for the transaction to the user, and may receive, from the payment terminal, at least one of a tender or a non-tender from the user, wherein the payment terminal receives the at least one of the tender or the non-tender from a communication device of the user. Thus, the at least one of the tender of the non-tender may be received from the POS device, at least one funding source associated with the at least one of the tender or the non-tender may be communicated back to the POS device, and the POS device may communicate with a payment host to authorize at least a portion of the total amount using the at least one of the tender or the non-tender and updates the total amount for the transaction based on the at least the portion of the total amount authorized by the payment host.

Figure 4:
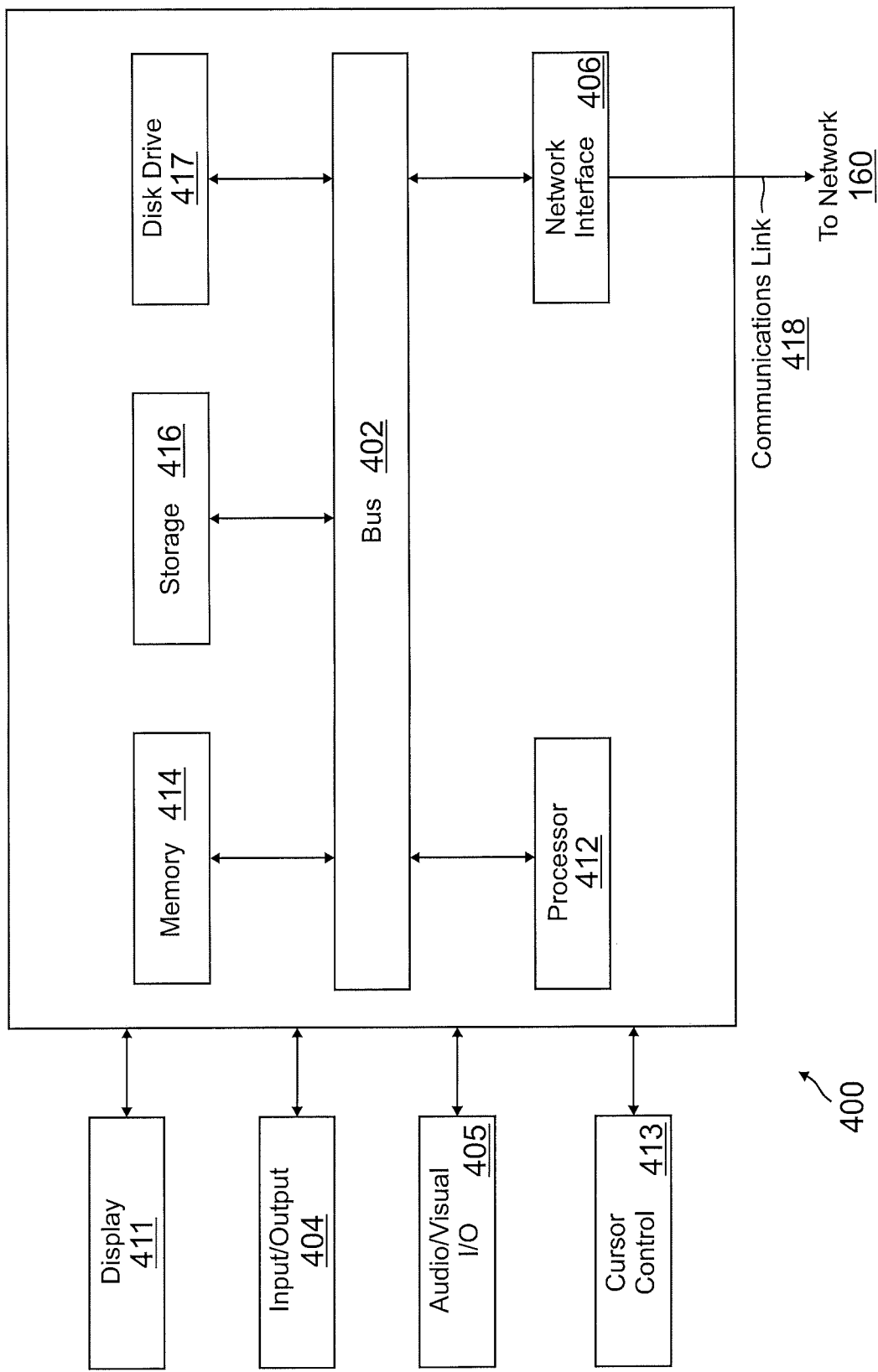
FIG. 4 is a block diagram of a computer system suitable for implementing one or more components in FIG. 1, according to an embodiment.

FIG. 4 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons, image, or links, and/or moving one or more images, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another communication device, service device, or a service provider server via network 160. In one embodiment, the transmission is wireless, although other transmission mediums and methods may also be suitable. One or more processors 412, which can be a micro-controller, digital signal processor (DSP), or other processing component, processes these various signals, such as for display on computer system 400 or transmission to other devices via a communication link 418. Processor(s) 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor(s) 412 and other components by executing one or more sequences of instructions contained in system memory component 414. Logic may be encoded in a computer readable medium, which may refer to any medium that participates in providing instructions to processor(s) 412 for execution. Such a medium may take many forms, including but not limited to, non-volatile media, volatile media, and transmission media. In various embodiments, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

FIG. 5 is various protocols that may be used to implement the processes described herein, according to an embodiment. FIG. 5 includes various communication protocols utilized through check-in and/or initiation of a transaction through completion of such transaction. In this regard, FIG. 5 displays that QR code scanning, BLE, and/or NFC communications may be utilized by customized SDKs of a communication device to convey information to a merchant device, for example, to engage in transaction processing. FIG. 5 includes the following phases in the life-cycle of a transaction, namely Start-Of-Transaction, Presentment and selection of a non-tender or a tender and completion of a transaction. Checkin includes application of offers and incentives which maybe optional (0). The transaction phases can be achieved via merchant device configuration associated with the communication device on a Mobile (M), QR Code Scanning on Mobile, BLE or NFC (from Mobile). Thus, the aforementioned communication protocols may be utilized to convey one or more tenders and/or non-tenders to a merchant device based on the capabilities of both devices, as discussed herein.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed:

1. A system comprising:
    a non-transitory memory storing instructions; and
    one or more hardware processors coupled to the non-transitory memory and configured to read the instructions form the non-transitory memory to cause the system to perform operations comprising:
        receiving an indication that a device is at a location of an entity;
        associating a user of the device with a transaction for processing at the location, wherein the associating includes determining an entity identifier associated with an entity device of the entity;
        retrieving a digital wallet having tender data for tenders of the user usable for a transaction processing of the transaction;
        synchronizing a first application on the device with the transaction for the transaction processing and the tenders using at least the entity identifier, wherein the synchronizing enables the user to select from the tenders for the transaction processing using the digital wallet;
        generating, by a framework in the system based on the digital wallet, tokenized data for the transaction processing by the system with the entity device, wherein the tokenized data is associated with one or more of the tenders selected for the transaction processing, and wherein the framework is configured for integrating a second application on the entity device with the system for the transaction processing of the tokenized data;
        determining an acceptance mechanism utilized by the second application to receive the tokenized data at the location via a short-range communication protocol, wherein the acceptance mechanism is determined based on the framework;
        configuring the first application using a first software development kit (SDK) and the second application using a second SDK for use of the acceptance mechanism via the short-range communication protocol for the transaction processing of the tokenized data at the location; and
        processing, by the system with the entity device based on the entity identifier and the tokenized data, the transaction using the one or more of the tenders associated with the digital wallet of the device.

2. The system of claim 1, wherein the operations further comprise:
    providing, by the system to the entity device, one or more non-tenders for use with the transaction; and
    applying, by the system, the one or more non-tenders to the transaction for processing.

3. The system of claim 2, wherein the providing is based in part on an association between the entity and the device.

4. The system of claim 2, wherein the processing includes applying the one or more non-tenders prior to processing the transaction with the one or more of the tenders.

5. The system of claim 2, wherein the one or more non-tenders include one of loyalty points, a discount, or a gift card.

6. The system of claim 2, wherein unused non-tenders are stored in the digital wallet, and wherein the digital wallet is further associated with the device.

7. The system of claim 1, wherein the entity communicates with a digital wallet cloud corresponding to the digital wallet for a payment provider associated with the device using the framework in the system.

8. The system of claim 1, wherein the associating is based on a token exchange between the entity and the device.

9. A method comprising:
    receiving, by a system, an indication that a device is at a location of an entity;
    associating, by the system, a user of the device with a transaction for processing at the location, wherein the associating includes determining an entity identifier associated with an entity device of the entity;
    retrieving, by the system, a digital wallet having tender data for non-tenders of the user usable for a transaction processing of the transaction;
    synchronizing, by the system, an application on the device with the transaction for the transaction processing and the non-tenders using at least the entity identifier, wherein the synchronizing enables the user to select from the non-tenders for the transaction processing using the digital wallet;
    generating, by a framework in the system based on the digital wallet, tokenized data for the transaction processing by the system with the entity device, wherein the tokenized data is associated with one or more of the on-tenders selected for the transaction processing, and wherein the framework is configured for integrating a second application on the entity device with the system for the transaction processing of the tokenized data;

determining an acceptance mechanism utilized by the second application to receive the tokenized data at the location via a short-range communication protocol, wherein the acceptance mechanism is determined based on the framework;

updating the first application using a first software development kit (SDK) and the second application using a second SDK for use of the acceptance mechanism via the short-range communication protocol for the transaction processing of the tokenized data at the location; and processing, by the system with the entity device based on the entity identifier and the tokenized data, the transaction using the one or more of the non-tenders associated with the digital wallet of the device.

10. The method of claim 9, wherein the processing is further based on tenders associated with the device.

11. The method of claim 10, wherein the processing includes applying the tenders prior to processing the transaction using the one or more of the tenders.

12. The method of claim 9, wherein the one or more non-tenders include one of loyalty points, a discount, or a gift card.

13. The method of claim 9, wherein unused non-tenders are stored in the digital wallet, and wherein the digital wallet is further associated with the device.

14. The method of claim 9, wherein the entity communicates with a digital wallet cloud corresponding to the digital wallet for a payment provider associated with the device using the framework in the system.

15. The method of claim 9, wherein the associating is based on a token exchange between the entity and the device.

16. A non-transitory machine-readable medium having stored thereon machine-readable instructions executable to cause a machine to perform operations comprising:

receiving an indication that a device is at a location of an entity;

associating a user of the device with a transaction for processing at the location, wherein the associating includes determining an entity identifier associated with an entity device of the entity;

retrieving a digital wallet having tender data for tenders of the user usable for a transaction processing of the transaction;

synchronizing an application on the device with the transaction for the transaction processing and the tenders using at least the entity identifier, wherein the synchronizing enables the user to select from the tenders for the transaction processing using the digital wallet;

generating, by a framework in the system based on the digital wallet, tokenized data for the transaction processing by the system with the entity device, wherein the tokenized data is associated with one or more of the tenders selected for the transaction processing, and wherein the framework is configured for integrating a second application on the entity device with the system for the transaction processing of the tokenized data;

determining an acceptance mechanism utilized by the second application to receive the tokenized data at the location via a short-range communication protocol, wherein the acceptance mechanism is determined based on the framework;

causing the first application and the second application to use the acceptance mechanism for the transaction processing of the tokenized data at the location via the short-range communication protocol using a first software development kit (SDK) of the first application and a second SDK of the second application; and processing, by the system with the entity device based on the entity identifier and the tokenized data, the transaction using the one or more of the tenders associated with the digital wallet of the device.

17. The non-transitory machine-readable medium of claim 16, wherein the processing includes providing non-tenders based in part on an association between the entity and the device.

18. The non-transitory machine-readable medium of claim 17, wherein the processing includes applying the non-tenders prior to processing the transaction using the one or more of the tenders.

19. The non-transitory machine-readable medium of claim 17, wherein the non-tenders include one of loyalty points, a discount, or a gift card.

20. The non-transitory machine-readable medium of claim 17, wherein unused non-tenders are stored in the digital wallet, and wherein the digital wallet is further associated with the device.

\* \* \* \* \*